July 23, 1929.  J. W. GORDON  1,722,209

OPTICAL INSTRUMENT

Filed April 27, 1925 4 Sheets-Sheet 1

Inventor
J. W. Gordon
By Marks & Clerk
Attys

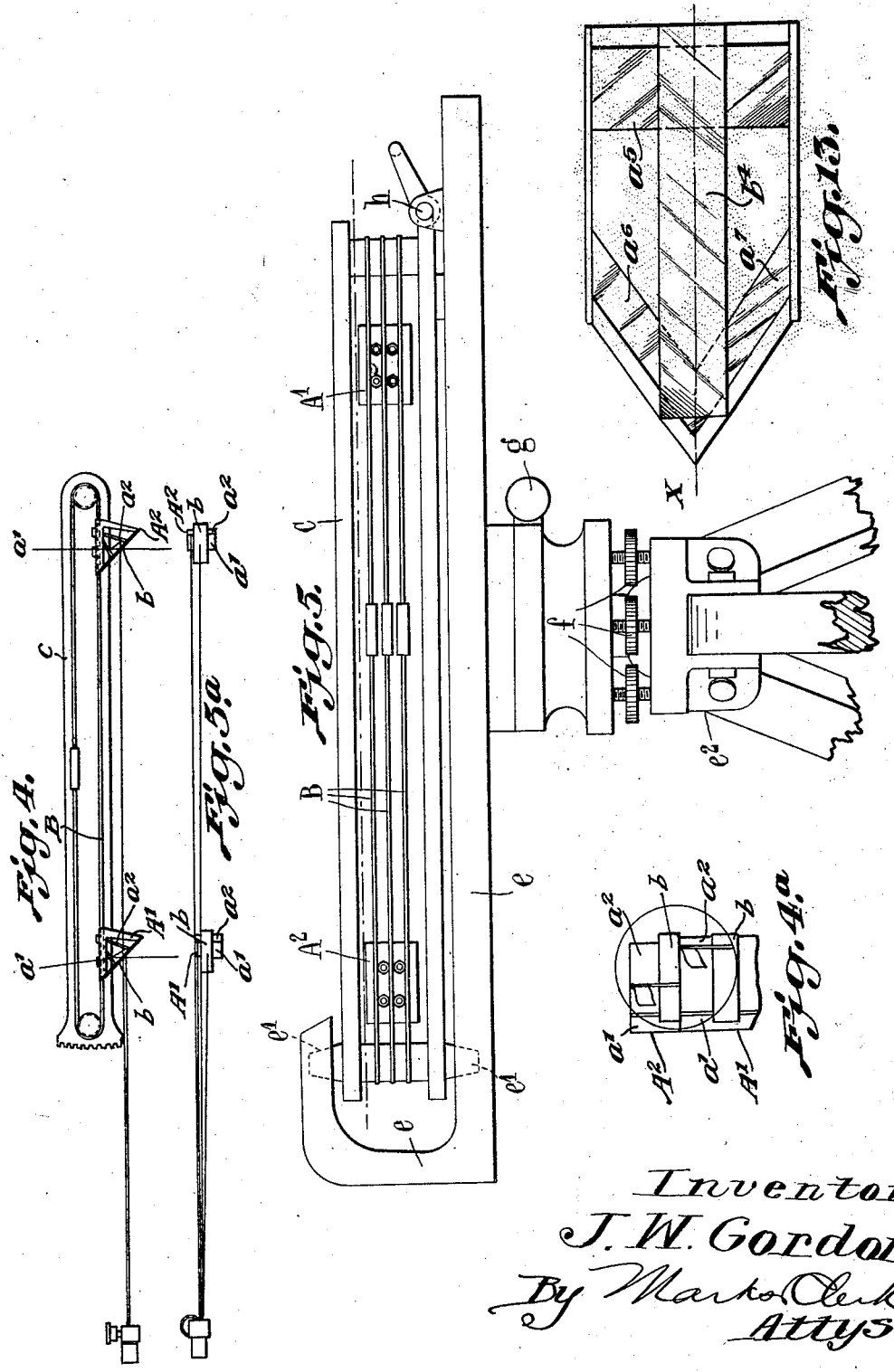

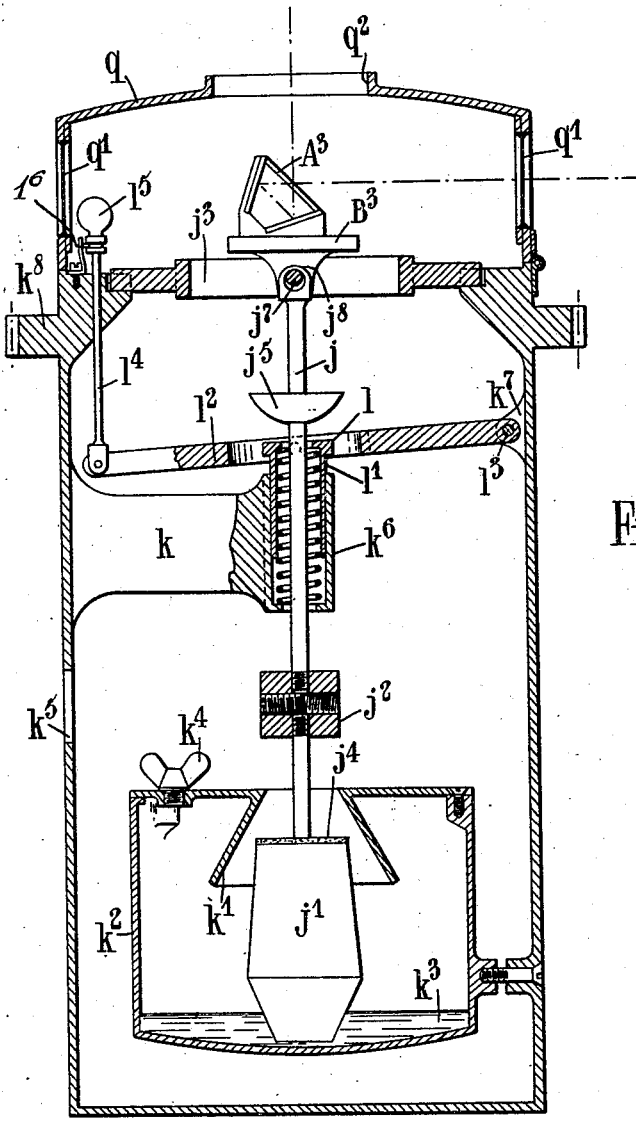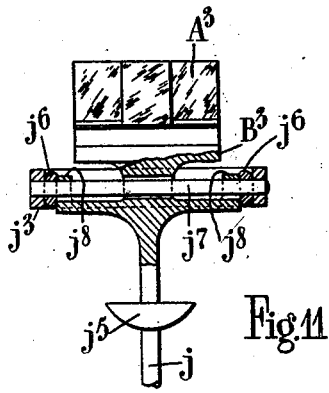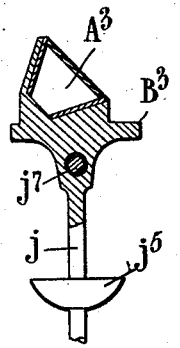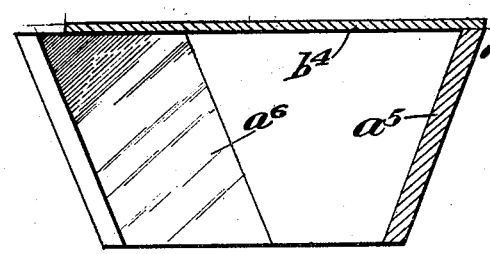

July 23, 1929.  J. W. GORDON  1,722,209
OPTICAL INSTRUMENT
Filed April 27, 1925     4 Sheets-Sheet 4

Inventor
J. W. Gordon
By Marko Clerk
Attys.

Patented July 23, 1929.

1,722,209

UNITED STATES PATENT OFFICE.

JOHN WILLIAM GORDON, OF LONDON, ENGLAND, ASSIGNOR TO ALEXANDER CONSTANTINE IONIDES, OF LONDON, ENGLAND.

OPTICAL INSTRUMENT.

Application filed April 27, 1925, Serial No. 26,245, and in Great Britain May 5, 1924.

This invention relates to optical instruments such, for example, as are employed in reading angular magnitudes by the instrumentality of mirrors or like reflecting surfaces.

The object of the invention is to provide improved instruments adapted to facilitate the taking of readings and to increase the accuracy thereof.

The invention consists in a combination of mirror reflecting surfaces adapted to provide the same image or picture in two adjacent fields, one of which is reversed, it may be singly reversed or doubly reversed, in relation to the other, or to provide two similar images juxtaposed the one to the other but not reversed.

The invention further consists in an appliance referred to as a "double square," comprising the combination with two facing mirror reflecting means disposed in two or more planes suitably inclined to one another of additional mirror reflecting means disposed in one or more planes with fixed or adjustable angular relation to the said facing mirrors for simultaneously presenting two separate images to the eye of an observer.

The invention further consists in a combination of three mirror reflectors having their surfaces disposed at right angles to a plane which divides one from the other two, said last-mentioned two having the planes of their reflecting surfaces equally inclined to a plane containing the reflecting surface of the third and intersecting in a line parallel to said plane.

The invention further consists in a combination of not less than three mirror reflectors with the surfaces of not less than two disposed parallel to a line and not all occupying the same region in the direction of the length thereof, said mirrors or the like being adapted to determine a distant line or point or to determine the angle between a pair of such lines or points by simultaneously directing into the eye of an observer the reflections from two different mirror surfaces at different distances therefrom.

The invention also consists in improvements in or relating to optical instruments as hereinafter described.

In this specification the term "optical square" is used in a large sense in which it is applied to a pair of facing mirrors, whatever the angle at which they meet in their line of intersection, if the purpose to which they are put is that of causing an optical axis to be deflected so that the angle of deviation or the midmost of the three external angles resulting from the crossing of the incident and emergent rays is equal to twice the complement of the angle between the mirrors which is in accordance with the equation $$a = \frac{\pi}{2} - \frac{x}{2} \quad \text{(1)}$$

where $a$=the angle between the mirrors measured on a plane perpendicular to their line of intersection and $x$ is the angle of deviation of the optical axis as above defined.

Now for some purposes it is desirable to substitute for one of the plane mirrors a second optical square and this is necessary if it is desired to substitute double reversal for the single reversal of the object which results from the use of a plane mirror in combination with a simple optical square. In other respects the second optical square acts like a plane mirror and may be used in the same way for the measurements of angles.

Referring now to the accompanying drawings:—

Figure 4 is a plan of a range-finding frame showing two "double-squares" mounted thereon, and illustrating the operation of the arrangement.

Figure 4ª is an illustration of the general appearance of the double squares as viewed for taking a range.

Figure 5 is a side or back elevation of the same to a rather larger scale showing the method of mounting and supporting the "double-squares" and means for levelling the frame and rotating it about one of its ends.

Figure 6:
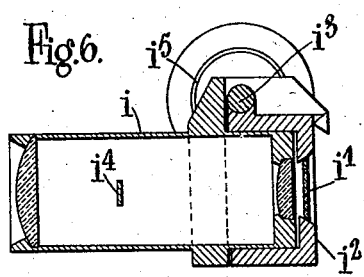

Figure 5ª is a front view corresponding to Figure 4 looking in the direction of the incident light rays and showing for simplicity only the reflecting surfaces;

Figure 6 is a longitudinal section of a convenient form of ocular or telescope for use with the above apparatus.

Figure 7:
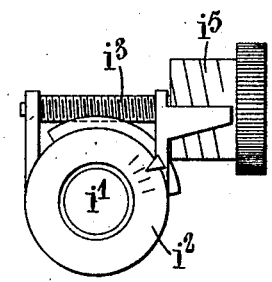

Figure 7 is an end view of the above ocular and showing a device for measuring the range.

Figure 8:
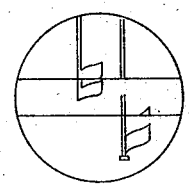

Figure 8 is an illustration of the appearance of the optical field of the ocular when it is used in conjunction with the apparatus illustrated in Figures 4 and 5 for finding the range of a distant flagstaff.

Figure 9:
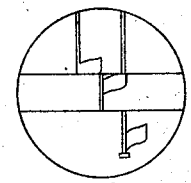

Figure 9 is an illustration of the appearance of the optical field after adjustment of the measuring means.

Figure 10 is a vertical half-section of a pendulum level embodying a "double-square."

Figure 11 is a vertical part section showing the gimbal-ring mounting for the "double-square."

Figure 12 is a vertical section of the level taken at right angles to that of Figure 11.

Figure 1:
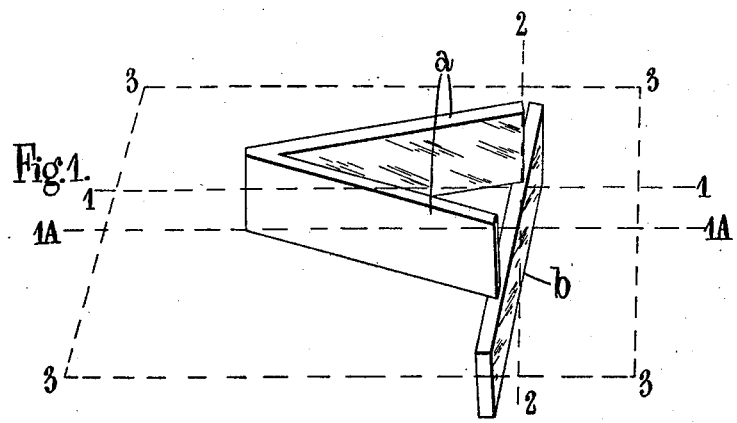
Figure 1 is a primitive representation of a double square.
Figure 15:
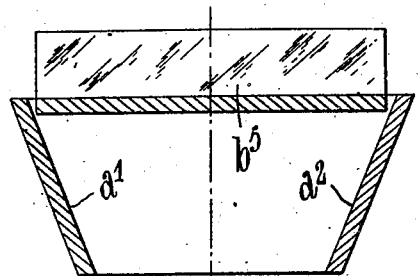
Figure 16:
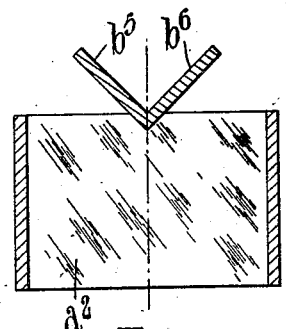

Figures 13 and 14 show an alternative form of double square suitable for use in a theodolite or astronomical instrument these views being diagrammatic like Figure 1;

Figures 15 and 16 show also diagrammatically another modification in which two optical squares are employed.

Figure 17:
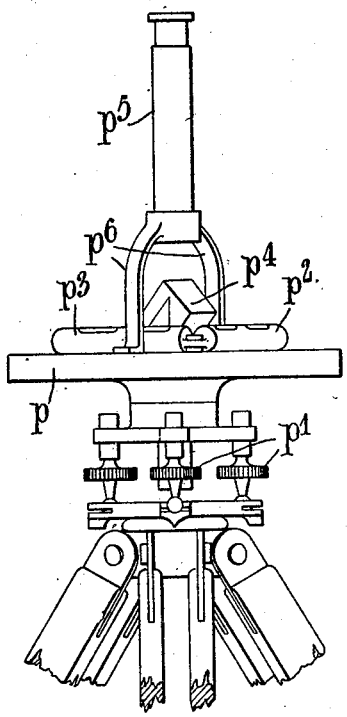

Figure 17 shows a spirit level.

Figure 2:
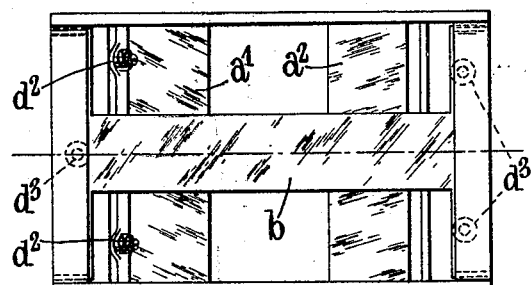
Figures 2 and 3 show the application of a double square to a gun sight.
Figure 3:
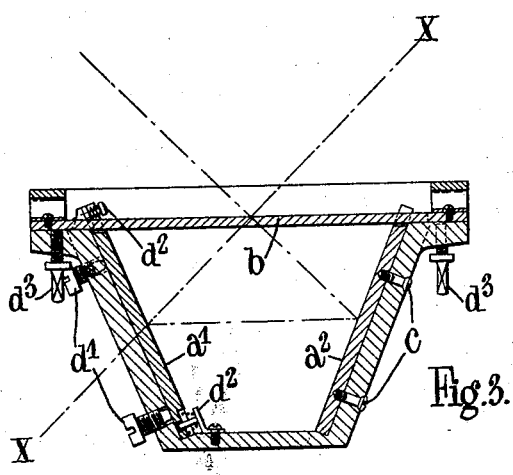
Figure 18:
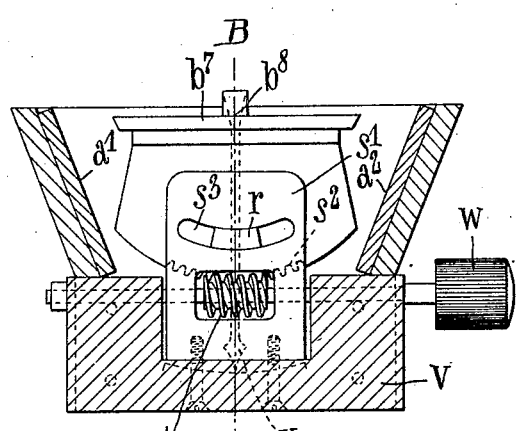
Figure 19:
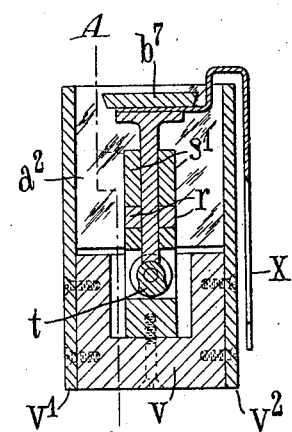

Figures 18 and 19 show a construction on the lines of Figures 2 and 3 but with the inclination of one of the reflectors adjustable.

As an example of one way of carrying the invention into effect a combination of mirrors, hereinafter referred to as a "double square," is formed of two inclined mirrors $a$, $a$, known as an "optical square," combined with a plane mirror $b$, these two elements being so adjusted in position that the reflecting surface of the plane mirror $b$, lies at right angles (or it may be at some other determined or adjustable angle) to the axis of symmetry 1, 1, of the optical square formed by the two mirrors $a$, $a$. The form here described is one in which the system is rectangular, that is to say the surface of the plane mirror $b$ stands at right angles to the axis of symmetry 1, 1, of the optical square. In this case the optical square mirrors $a$, $a$, and the plane mirror $b$ will reflect the same objects into the eye of the observer along a line parallel to a line 2, 2, which may be described as the principal axis of the system.

The principal axis of the system or line 2, 2, is perpendicular to a plane 3, 3, 3, 3, which may be called the "horizon plane" of the double square and intersects its axis of symmetry 1A, 1A. The horizon plane just mentioned is a plane containing or parallel to the axis of symmetry 1A, 1A, of the double square, which plane divides the field of view projected by the optical square from that projected by the plane mirror when the double square is brought into use.

In one convenient and very simple construction of an optical square two plane mirrors are placed at an angle of 45° to one another, the line bisecting the angle between the centre lines of the mirrors being the axis of symmetry of the square. A plane mirror is disposed with its reflecting surface at right angles to the axis of symmetry of the optical square and a line perpendicular to the axis of symmetry and lying in the plane of the reflecting surface of the plane mirror is the line hereinbefore referred to as the principal axis of the combination. A line parallel to the axis of symmetry of the optical square, lying on the before-mentioned horizon plane and intersecting the principal axis, is herein spoken of as the axis of symmetry of the double square. The horizon plane is a plane parallel to the axis of symmetry of the optical square which passes through the two points in which the mirror surfaces of the optical square make contact with the plane mirror. All the three mirror surfaces of the double square are disposed perpendicular to the horizon plane.

A double square constructed as above described and shown in Figure 1, has certain optical properties which fit it for use with advantage in many optical instruments. The optical square and plane mirror reflecting the same view reflect it in reversed aspects respectively; that is to say, reversed right for left, or top for bottom, according as the horizon plane is held in a horizontal or vertical position. The image seen in the field of the optical square is always normal, the image seen in the plane mirror is simply (i. e. not doubly) reversed. Hence, the same picture appears in both fields but coincidence is obtained only of its several central features such coincidence herein termed central coincidence being obtained along the principal axis. If the projection of the principal axis upon the optical field is called its prime meridian, then any object seen to one side of that line in the normal image of the optical square will be seen equally distant from it, on the other side of it, in the reversed image of the plane mirror. If by proper motion of the objects so identified or by the motion of the double square (for instance rotation of the latter about a point either externally or internally thereof) such objects are caused to approach or to recede from the prime meridian, their apparent movement of approach towards or recession from one another will take place with double velocity.

The principal axis of the double square being projected, as stated in the last paragraph, as an identifiable line in the optical field of the instrument, in which its reversed images meet, constitutes a fiducial line at right angles to the horizon plane of the instrument, this plane being also identifiable by its projection in the picture.

A few examples of the use of the double square may now be mentioned by way of illustrating its applications to optical instruments, such applications being far too many to be all enumerated.

The application of a double square to a gun sight is illustrated by Figures 2 and 3. In these figures the line $x$—$x$ at an angle of 45° with the plane mirror surface represents the axis upon which the gun is to be laid and it will be understood that this axis may be identified upon the gun itself or upon the gun carriage or upon a director used to control the laying of the gun as the case may be. The double square, shown in plan, is placed so as to direct the image of the object into the observer's eye and the image may be viewed with a telescope if so desired, the double square serving thus either as an open sight or, with an added glass, as a telescopic sight.

In the figures $a_1$, $a_2$ are the facing mirrors of the optical square disposed at an angle of 45° to one another. $b$ is a plane mirror disposed at an angle of 67½° to each of the facing mirrors. In order that the mirrors may be adjusted and maintained in correct position they are mounted in a box or casting $d$ having the necessary solidity. One of the facing mirrors, the mirror $a_2$ for example, may be fixed by screws $c$ in position on one of the side walls of this box. On the opposite wall the second mirror $a_1$ is adjustably mounted, its exact position being controlled by adjusting screws $d'$ and compressing springs $d^2$ in the manner commonly used in adjusting the position of mirrors in sextants and such like instruments, the holding members being made robust in due relation to the strains to which the instrument will be subjected in use. In view of these conditions of use I find that stainless steel constitutes a very suitable material of which to form the mirrors. The plane mirror $b$ is in like manner adjustably mounted on the open front of the box by means of screws $d^3$ in the position shown.

In Figure 2 the plane mirror $b$ is shown as occupying a central position in front of the optical square, and when in this position it is important to consider what breadth shall be given to the plane mirror in order that if used with a telescope it may not cover up too large a part of the aperture of the object glass, but in case of a naked eye observation the double square being used as an open sight the observer must be placed so that he looks either over or under the plane mirror into the optical square, as the naked eye cannot see both over and under the mirror $b$ at the same time owing to the necessary breadth of the mirror. If, however, the observer uses a telescope the object glass will be of sufficient diameter to see past the plane mirror both over it and under it and it is then convenient to place the plane mirror centrally because it is in that case not material that the line of collimation of the telescope should be placed exactly at the level of either edge of the plane mirror. In such a case the breadth of the plane mirror should be, say, something between a third and a half of the effective diameter of the object glass. The exact breadth is to be determined with reference to the reflecting power of the plane mirror and of the optical square respectively. Inasmuch as the image is twice reflected from the optical square it may be taken for granted that it will be feebler than the image reflected from the plane mirror for equal breadth of mirror surface and the visible areas of plane mirror and optical square are to be so adjusted as to give convenient equality of illumination to the images which are by the double square juxtaposed for observation. When the double square is used without a telescope, or if the plane mirror is of excessive breadth in relation to the object glass of the telescope used, the eye, or the telescope, as the case may be, must be nicely adjusted so as to see past the plane mirror into the optical square and to receive a suitable number of image forming rays from each component of the double square.

In instruments of the range-finder class, the double square has very useful applications.

The application of the double square to the construction of a range-finder is illustrated by Figures 4, 4ª, 5, 5ª, 6, 7, 8 and 9.

In this case the range is taken as in rangefinders of the Barr and Stroud type by observing the angle between two beams of light which, being separated at the two ends of the optical base of the instrument, converge to a point in the object of which the range is to be taken. In Figures 4 and 5 $A_1$, $A_2$ are two double squares mounted on a known base constituted by two or more wires B, B, B, stretched upon a strong frame C sufficiently tightly to have no measurable sag under the weight of the two double squares which are mounted so as to be parallel to one another, but to have their plane mirror surfaces at some definite angle, which may conveniently be made slightly greater than 45° to the wire surface. The tension of the wires is made sufficiently great to secure the taking up without flexure of any variation of length that may result from changes of temperature either in the wires or in the frame.

The frame C is mounted by means of pivots $e'$, $e'$ to swing in a base $e$ which is itself carried on a tripod or other suitable support $e^2$. The base $e$ is rotatable about the centre of the support $e^2$ for the purpose of roughly training the double square upon the object, fine adjustment being provided for by the swinging of the frame C about its pivots $e'$, $e'$. In order to provide for the necessary movement of the base $e$ upon its support, there are provided levelling screws $f$ and a clamp $g$ for fixing its position in azimuth.

The range-finder is placed approximately in position to sight the object from the left-hand side of Figures 4 and 5ª through the double squares $A_1$, $A_2$. By means of a tangent screw $h$ which, being mounted on the base $e$, acts upon a rack at the free end of the supporting frame C and serves to effect the exact adjustment of this frame the latter is then moved exactly into position to obtain exact central coincidence of the images in for instance the double square $A^2$.

The appearance of the reflecting systems or double squares as viewed by the observer with the naked eye or an ordinary telescope assuming that the object being sighted is a flagstaff is shown in Figure $4^a$. The two partial images in one say the remote system $A^2$ have been brought into coincidence as above (coincidence not being possible in both systems simultaneously) but the images in $A^2$ and $A^1$ are sidewise relatively displaced.

The range is conveniently taken by exact observation of the displacement between the two images. This displacement is very small and has been exaggerated intentionally in Figure $4^a$ and various methods of measuring such small angles are known. The use of the invention is not confined to any particular method of effecting this operation: but the following known method illustrated by Figures 6, 7, 8 and 9 and also in Figures 4 and $5^a$ is recommended for use in this connection. Figures 6 and 7 show the construction of an ocular, shown also in operative position in Figures 4 and $5^a$ in which the eyepiece $i$ is covered by a diffraction grating $i'$ through which the observer views the object in the focal plane of the glass.

This diffraction grating is of suitable periodicity but is of coarse structure as diffraction gratings go. A sufficient indication of its fineness may be given by saying that for some cases a diffraction grating of 500 lines to the inch is sufficiently fine to be serviceable. The diffraction grating is mounted in a rotatable cap $i^2$ fitting over the eyepiece $i$ and is caused to rotate by a tangent screw $i^3$ or other slow motion propeller under the control of the observer. Any suitable scale may be employed to read the angle so turned through and may be graduated so as to read ranges direct or otherwise to yield the data from which the ranges may be determined as desired.

The focal plane of this eyepiece is crossed by a narrow horizontal parallel band $i^4$ of opaque substance forming a dark field of convenient width from which no undiffracted or geometrically straight light from the object glass reaches the observer's eye, but when the diffraction grating is so arranged that the axis of its rulings lies parallel to the dark band the diffracted images of the upper and lower fields divided by the said dark band are projected on to the said band and there become visible. The dark band $i^4$ is to be of a breadth convenient in use and the diffraction grating sufficiently fine—but no finer—to cause the diffracted image of the upper half of the field of the glass to spread over the upper half of the dark band and the diffracted image of the lower field to spread over the lower half of the dark band when the grating is arranged as above mentioned with the axis of its rulings parallel with that of the dark band. The appearance of the focal plane under these conditions is shown in Figures 8 and 9, it being assumed again that the object ranged upon is a flagstaff. It is to be observed that the two images are separated by an interval sufficient to cause the fiducial object to appear on both the upper and lower fields of the ocular described. This is effected, as will be easily understood, by causing the optical axes of the two double squares to deviate from the true line of collimation by a suitable small angle the one directed above and the other below the axis of collimation of the telescope so as to give the effect shown in Figure $4^a$ and project light rays from the object in the manner also shown in Figures 4 and $5^a$.

In Figure 8 it is to be observed that the diffraction images shown in the dark field reproduce the adjacent parts of the upper and lower bright fields without lateral displacement. In Figure 9 the appearance is shown when the diffraction grating has been rotated by the tangent screw $i^3$ through a sufficient angle to cause the diffracted images to travel towards one another to such an extent as causes the two segments of the flagstaff to coincide with one another. The angle through which the diffraction grating has rotated (or, as the case may be, the range of the object flagstaff) is read upon the drum $i^5$.

Figures 10, 11 and 12 show the application of the double square to the construction of a level. In Figure 10 the double square $A^3$ is shown mounted on a level platform $B^3$, the platform being kept level by the pendulum $j$ upon which it is mounted. The double square $A^3$ takes the place of a telescope or if higher magnifying power is required a telescope may be held vertically over the double square and the observation made with its aid, a Galilean telescope held in the hand serving for low magnifying power or a telescope steadily supported will meet a demand for higher power.

Figures 10, 11 and 12 show a pendulum level to the construction of which the double square by reason of its lightness readily lends itself. Such a level has the merit of taking up its position automatically and almost instantaneously, and in the form shown the pendulum marked $j$ is provided with a heavy bob $j'$ and a compensator weight $j^2$ for adjusting it to swing true. It is mounted by means of suspending parts to be presently described in a gimbal ring $j^3$. This gimbal ring is suspended in a containing cylinder $k$ by means of a pair of robust knife-edges which rest in two V-grooves in the top of the cylinder and can be freely lifted out of their seating when necessary. The bob $j'$ has a circular upper face provided upon its edge with a fibre ring $j^4$ which, when the pendulum is lifted off its supports on the top of the cylinder, can be caused to fit closely into the hollow cone $k'$ thus closing the chamber $k^2$. This dismounting of the pendulum is facilitated by fitting the pendulum near its upper end with a boss $j^5$ having a spherical under face below which there is supported independently of the pendulum a ring $l$ placed concentrically with the pendulum in its vertical position so as to surround it, the ring being wide enough to stand clear of the pendulum in all positions. This ring can be operated from outside the cylinder and caused to slide up and coming into contact with the boss $j^5$ to lift it and with it the pendulum. The pendulum may be thus lifted high enough to cause the knife-edges to clear the V-grooves and allow the gimbal ring $j^3$ and pendulum $j$ to be turned round for the purpose of reversing the direction of vision and taking a backsight.

The dashpot $k^2$ is made as shown with a hollow spherical bottom $k^3$ and at the top with a coned aperture $k'$ through which the pendulum passes with necessary room to swing free. The inturned cone $k'$ serves as a confining wall to prevent the escape of the liquid used to damp the vibrations of the pendulum if during transport or by mischance the dashpot should become inverted. A filling hole through which the damping liquid may be introduced into and removed from the dashpot is provided in the top of the dashpot and is closed when not in use by a screwed-down plug $k^4$.

For adjusting the position of the pendulum when swinging free the compensator weight $j^2$ is provided with a threaded plug which can be screwed in or out of its seating into an exactly adjusted position which causes the freely suspended pendulum to assume the desired angle to the horizontal plane. An opening $k^5$ in the enclosing cylinder $k$ admits a screwdriver or other tool for the purpose of adjusting this plug.

The locking ring $l$ is formed by the top edge of a cylindrical plunger $l'$ which fits into an external cylinder $k^6$ and slides therein. A coiled spring placed within the inner cylinder and bearing on a flange disposed on the interior near the top of this cylinder and resting on a similar internal flange at the bottom of the cylinder $k^6$ keeps the ring $l$ continually at the limit of its upward movement subject to the control of the lever $l^2$. The lever $l^2$ pivoted at $l^3$ to a boss $k^7$ mounted on the interior of the containing cylinder $k$, is divided centrally so that it may bear evenly on both sides of the ring $l$ and is actuated and controlled by a rod $l^4$ provided with a head $l^5$ by which it can be manipulated from outside the containing cylinder, a catch $l^6$ being provided to retain it in position.

For the purpose of suspending the pendulum $j$ the arrangement shown in Figures 11 and 12 may be employed. In the gimbal ring $j^3$ two circular recesses are formed on opposite sides in which a cylindrical rod $j^7$ is freely held and on to the rod the pendulum $j$ itself is hung by means of circular rings $j^8$, $j^8$, which fit loosely over the rod $j^7$. Distancing beads $j^6$, $j^6$, keep the pendulum centrally placed but out of contact with the gimbal ring $j^3$.

The container $k$ is provided near the top with a flange $k^8$ which fits into a recess in a rotatable ring mounted in the tripod stand by which the level is carried. A tangent screw connects the cylinder $k$ with the rotatable ring for the purpose of giving a fine adjustment in azimuth to the double square $A^3$ mounted on the gimbal ring $j^3$. For rough adjustment the rotatable ring itself is turned into the required position.

In order to protect the top of the pendulum and the double square mounted on it from disturbance by wind and air currents, the top of the cylinder $k$ may be surmounted by a drum or cover such as $q$ in which glazed windows $q'$ are provided fore and aft and an aperture $q^2$ at the top vertically over the double square through which observations can be made. This top aperture, when a telescope is used, is closed by the telescope which is placed upon the upper surface of the drum immediately over this opening. When the instrument is so set up the pendulum is entirely shut in from external air movements.

The rotatable ring $k^8$ in which the containing cylinder $k$ is mounted is carried on a tripod having adjustable legs, like those of a director stand. The adjustment of these legs enables a rough levelling of the tripod stand to be made by which the free swinging of the pendulum when in use is secured. Two spirit levels mounted on the rotatable ring indicate when the level is sufficiently correct for this purpose.

It may in some cases be desirable to make the level self-verifying. For that purpose it may be furnished with two double squares, one looking forward and the other backward. Then if the gimbal ring is turned through half a circle the two double squares will be interchanged and if the pendulum is hanging true they will both read on the same level point. If the instrument is out of adjustment the two double squares will give divergent readings. The compensator weight $j^2$ provides the means of correcting any error so disclosed.

The use of a double square in connection with a spirit level is shown in Figure 17. The lower part including the tribrach is identical with an ordinary level and is so shown in the drawing.

The new parts comprise the platform $p$ levelled by means of the tribrach levelling screws $p'$ and carrying the two spirit levels $p^2$, $p^3$ placed at right angles the one to the other. In the middle of the platform the double square $p^4$ is mounted in such position that it reflects the horizon into the eye of the observer at the telescope $p^5$. This telescope is carried by a pair of bracket arms $p^6$, $p^6$, by which it is made fast to the platform $p$ at right angles thereto or at any other angle which may be considered convenient, the angle and disposition of the double square being so adjusted that, as stated above, it will in use reflect the horizon through the telescope into the observer's eye.

For use in a theodolite or as an astronomical instrument the double square may with advantage be modified as in Figures 13 and 14 being of course suitably mounted as a hole in a box or frame as on the lines shown in Figures 2 and 3. In this form one of the faces of the optical square is fitted with a pair of mirrors $a^6$, $a^7$ which are placed at right angles to one another, the right angle being taken in a plane normal to the line in which these two mirrors intersect. In other respects this double square resembles the double square shown in Figures 2 and 3 having a facing mirror $a^5$ and plane mirror $b^4$. The effect of this modification is to cause the image reflected by the optical square to be doubly reversed; that is to say, reversed right for left and top for bottom; as compared with the image reflected by the plane mirror. Hence in this case the two reflected images have only a single point, not a line, in common and the double square in this form may be used for the simultaneous observation of the direction of the optical axis both in altitude and azimuth.

As an alternative to the last described form of the device an optical square may, as shown in Figures 15 and 16, be made of the usual form, that is, with a pair of plane facing mirrors $a^1$, $a^2$, the same as in Figures 2 and 3, and the double square be constituted by replacing a plane mirror, such as shown at $b$ in Figures 2 and 3, by means of a second narrow special optical square having its facing mirrors $b^5$, $b^6$, placed at right angles to one another with their line of intersection conveniently at right angles to the line of intersection of the other pair of facing mirrors.

In the forms of the device shown in Figures 2 and 3, 13 and 14 and 15 and 16, the inclination of the plane mirrors $b$ and $b^4$ and the inclination of the line of intersection of the mirrors $b^5$ and $b^6$ forming the narrow special optical square may be made adjustable as for the measurement of angles by means of such devices.

Figures 18 and 19 show one way of making the simple singly reversing double square shown in Figures 2 and 3 adjustable for variation of angle.

In this case the plane mirror $b^7$ is not attached to the cell or casing but is mounted adjustably in a fitting fixed to the floor of the cell and is actuated by a tangent screw and milled head. Figure 18 is a section on the line A—A of Figure 19. Figure 19 is a section on the line B—B of Figure 18.

The lower slotted block V is a casting which serves as a foundation to the cell in which the mirrors $a^1$, $a^2$, of the optical square are mounted by means of the cheeks $v^1$, $v^2$, and the plane mirror $b^7$ by means of the central fitting.

The central fitting consists of a curved sector $s$ having helical rack teeth $s^2$ on its circular edge and held between two plates $s_1$, $s_1$. The plates are pierced each by a circular slot $s^3$ in which a circular rib $r$ upon the sector $s$ runs, making a close fit against the sides of the slot. By these two ribs $r$ the sector is caused to move in a circular path—the point $b^8$ in the centre of plane mirror being the centre of the circle. A tangent screw $t$ working in the helical teeth $s^2$ in the edge of the sector $s$ actuates the plane mirror $b^7$ to move it into any required angular position with reference to the mirrors $a^1$, $a^2$, of the optical square. The tangent screw $t$ is controlled by the milled head $w$.

For the purpose of reading the angle between the rays reflected by the plane mirror $b^7$ and the optical square $a^1$, $a^2$, respectively, a reading point $x$, fitted with a vernier if required may be mounted on one end of the plane mirror $b^7$ and bent over the edge of the cell so as to read against a scale engraved on the outside of the cheek $v^2$ forming the cell wall or any other convenient method of reading this angle may be substituted. Any of the other forms may be made adjustable for variation of angle, in the manner illustrated or by other means.

There are other uses to which the double square and inflexible base may be put, and it is to be understood that the foregoing examples are given by way of illustration only; alterations and additions may also be introduced without in any way departing from the spirit of this invention.

Having now described my invention, what I claim as new and desire to secure by Letters Patent is:—

1. In an instrument for use in connection with distinct objects, the combination with a pair of facing mutually inclined reflecting means not greatly remote from each other and adapted to coact to receive incident rays from a field containing said object and to reflect said rays across the axis of their original incident path at an angle equal to twice the complement of the angle between said reflectors to produce an image of said field, of additional reflecting means adapted to receive rays from said field containing the object and so arranged across the front of said first-mentioned means as to reflect said rays to produce a second image of said field juxtaposed and reversed in at least one sense relatively to the image produced by said first-mentioned reflecting means, and means operative in connection with the combination for enabling same as a whole to be directed upon said distant object to determine the relation between same and said combination.

2. In an instrument for use in connection with distant objects, the combination with a pair of adjacent facing mirrors inclined at substantially 45° to each other and adapted to coact to receive incident rays from a field containing said object and to reflect said rays across the axis of their original incident path to produce an image of said field, of additional reflecting means adapted to act upon rays from said field containing the object, said additional means being narrower than said first-mentioned means and arranged transversely across the front thereof to produce by reflection a second image of said field justaposed and reversed relatively to the image produced by said first-mentioned mirrors, and means operative in connection with the combination for enabling same as a whole to be directed upon said distant object to determine the relation between same and said combination.

3. In an instrument for use in connection with distant objects, the combination with a pair of facing adjacent rectangular plain mirrors inclined at substantially 45° and adapted to coact to receive incident rays from a field containing said object and to reflect said rays across the axis of their original incident paths to produce a normal image of said field, of a narrower plane mirror arranged closely adjacent to, across the front of and similarly inclined to each of said first pair, said narrower mirror being adapted to produce a reversed second image of said field divided by one bounding edge of said narrower mirror from the image formed by the said first-mentined pair, and means for enabling the inclination of said mirrors as a whole relatively to the direction in which the object lies to be set for determining the relation between the latter and the combination.

4. In a range-finder, the combination with reflecting means of the optical square type adapted to produce a normal image of a distant field, of additional reflecting means rotatably mounted as a whole with said first-mentioned means and so arranged in position and angularity with respect thereto as to produce a relatively reversed second image of said field juxtaposed to said normal image and to coact with said optical square means in such a way that, on rotating the combination as a whole whereby the image of any object in said second image of the field may be brought into central coincidence with the image of the same object in said first-mentioned image of the field, and means for rotating the combination.

5. In an optical instrument, the combination with an optical square, of additional reflecting means operative in conjunction therewith to produce two juxtaposed and relatively reverse images of one and the same field, by rotation of which combination as a whole the two images of an object occurring respectively in said juxtaposed field images may be brought into central coincidence, and means operative in connection with the combination for enabling same as a whole to be directed upon any desired object to determine the relation between same and the combination.

6. In an optical instrument the combination with an optical square comprising two facing plane reflectors inclined at substantially 45° to each other, of an additional plane reflector, narrower than and facing away from the first two and arranged closely across the front of said first two substantially normal to a plane bisecting the angle between them, means for enabling said combination to be directed upon any desired object and means for enabling rotation of the combination as a whole to be effected to obtain central coincidence of the two images of said object produced in juxtaposition relatively by the optical square and by the additional reflector.

7. In a range finder two such collections, of reflecting means as claimed in claim 1 set at a known distance apart and similarly situated with respect to a horizontal plane, means for supporting said collections in said positions, means for rotating said support to direct said collections upon an object and to obtain central coincidence of the two images of said object formed by one of said collections, and means for measuring the displacement between two images of the object formed respectively by the two collections.

8. In a range-finder, two such collections of reflectors as claimed in claim 6 similarly set upon a substantially horizontal rigid frame, a base rotatably carrying said frame, means for rotating said base in a substantially horizontal plane to obtain images of a distant object in each of said collections of reflecting means, means capable of fine adjustment for rotating said frame relatively to said base to obtain exact central coincidence of the two images of the object in one of the collections, and a magnifying ocular embodying a rotatable diffraction grating for measuring the relative displacement of the corresponding images respectively in the two collections of reflectors.

In testimony whereof I have signed my name to this specification.

JOHN WILLIAM GORDON.